US008125424B2

(12) United States Patent
Hong et al.

(10) Patent No.: US 8,125,424 B2
(45) Date of Patent: Feb. 28, 2012

(54) LIQUID CRYSTAL DISPLAY DEVICE AND DRIVING METHOD THEREOF

(75) Inventors: Jin Cheol Hong, Gyeongsangbuk-do (KR); Soon Dong Cho, Gyeongsangbuk-do (KR); Boo Han Kim, Chungcheongnam-Do (KR); Min Gi Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1022 days.

(21) Appl. No.: 11/824,045

(22) Filed: Jun. 29, 2007

(65) Prior Publication Data

US 2008/0129903 A1 Jun. 5, 2008

(30) Foreign Application Priority Data

Nov. 30, 2006 (KR) ............................... 2006-119545
Jun. 27, 2007 (KR) ................................ 2007-63408

(51) Int. Cl.
*G02F 1/33* (2006.01)

(52) U.S. Cl. ................ 345/87; 345/94; 345/95; 345/97; 345/98; 345/99; 345/211; 345/212; 345/213; 345/214; 349/33; 349/34; 349/36; 349/46

(58) Field of Classification Search .................... 345/87, 345/204, 98, 211, 94, 95, 99; 349/33, 34
See application file for complete search history.

(56) References Cited

U.S. PATENT DOCUMENTS 5,945,970 A * 8/1999 Moon et al. ..................... 345/92
5,969,512 A * 10/1999 Matsuyama .................. 323/272
6,064,360 A * 5/2000 Sakaedani et al. .............. 345/92
6,151,016 A * 11/2000 Kanbe et al. .................. 345/204
6,621,489 B2 * 9/2003 Yanagisawa et al. ......... 345/211
6,741,239 B2 * 5/2004 Iwasaki ......................... 345/211
6,940,481 B2 * 9/2005 Konno et al. ................... 345/96
6,961,034 B2 * 11/2005 Kusanagi ........................ 345/87
7,088,355 B1 * 8/2006 Ochi ............................. 345/211
7,158,130 B2 * 1/2007 Lee et al. ...................... 345/211
7,499,099 B2 * 3/2009 Kojima ......................... 348/373
7,595,780 B2 * 9/2009 Katagawa et al. .............. 345/87
2002/0041279 A1 * 4/2002 Chou ............................ 345/211
2002/0089482 A1 * 7/2002 Hanzawa et al. ............... 345/92
2003/0038768 A1 * 2/2003 Sakashita ........................ 345/87

* cited by examiner

*Primary Examiner* — Grant Sitta
(74) *Attorney, Agent, or Firm* — Brinks Hofer Gilson & Lione

(57) ABSTRACT

A liquid crystal display device and a driving method thereof, which are capable of preventing generation of a residual image upon power-off, are disclosed. The liquid crystal display device includes a power supply unit for outputting a plurality of drive voltages after delaying the drive voltages, a voltage detector for monitoring one of the drive voltages, and outputting a power-off detect signal based on the result of the monitoring, a timing controller for increasing a frequency of a control signal in response to the power-off detect signal, and outputting the frequency-increased control signal, a gate driver for outputting a scan signal in response to the frequency-increased control signal, a data driver for outputting a constant voltage in response to another control signal from the timing controller, and a liquid crystal panel for applying the constant voltage to all sub-pixels of the liquid crystal panel in response to the scan signal.

14 Claims, 6 Drawing Sheets

LIQUID CRYSTAL DISPLAY DEVICE AND DRIVING METHOD THEREOF

This application claims the benefit of the Korean Patent Applications No. P2006-119545, filed on Nov. 30, 2006, and P2007-63408, filed on Jun. 27, 2007, which is hereby incorporated by reference as if fully set forth herein.

BACKGROUND

1. Technical Field

The present invention relates to a liquid crystal display device, and more particularly, to a liquid crystal display device and a driving method thereof which are capable of preventing generation of a residual image upon power-off.

2. Description of the Related Art

Liquid crystal display (LCD) devices display an image using the electrical and optical properties of liquid crystals. This can be achieved by the anisotropic properties of liquid crystals exhibited in longer and shorter-axis directions of liquid crystal molecules in terms of physical values, such as refractive index and dielectric constant. One of the advantages of liquid crystals is that the molecular orientation and optical properties of liquid crystals can be easily controlled. In other words, LCD devices display an image by changing the orientation direction of liquid crystal molecules, and thus, controlling the light transmittance of the liquid crystals.

More specifically, such an LCD device displays an image by means of a liquid crystal panel in which a plurality of pixels are arranged in the form of a matrix. Each pixel of the liquid crystal panel displays a desired color through a combination of red, green, and blue sub-pixels, each of which controls the light transmittance thereof in accordance with a change in the liquid crystals. This change is made based on a data signal applied to the sub-pixel. To drive the liquid crystals, each sub-pixel is charged with a differential voltage between the data signal, which is supplied to a pixel electrode via a thin film transistor, and a common voltage, which is supplied to a common electrode. Since the liquid crystal panel of the LCD device is a non-luminous device, the LCD device is provided with a backlight unit for supplying light at the rear side of the liquid crystal panel.

However, such an LCD device has a disadvantage in that a residual image is displayed when the LCD device is powered off. This is not only because the liquid crystal panel is further driven for a predetermined time after the power supply unit of the LCD device is turned off due not only to a delay in cessation of the drive voltage supplied from the power supply unit to the driving circuit of the liquid crystal panel, but also due to the charged sub-pixels of the liquid crystal panel being slowly discharged through the associated turned-off thin film transistor.

BRIEF SUMMARY

Accordingly, an embodiment of the present invention is directed to a liquid crystal display device and a driving method thereof that substantially obviate one or more limitations and disadvantages of the related art.

A liquid crystal display device and method of driving a liquid crystal display device are disclosed. A power supply unit outputs a plurality of drive voltages after delaying the drive voltages. A voltage detector monitors one of the drive voltages, and outputs a power-off detect signal based on the result of the monitoring. A timing controller increases a frequency of a control signal in response to the power-off detect signal, and outputs the frequency-increased control signal. A gate driver outputs a scan signal in response to the frequency-increased control signal. A data driver outputs a constant voltage in response to another control signal from the timing controller. A liquid crystal panel applies the constant voltage to sub-pixels of the liquid crystal panel in response to the scan signal.

It is to be understood that both the foregoing general description and the following detailed description of the preferred embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
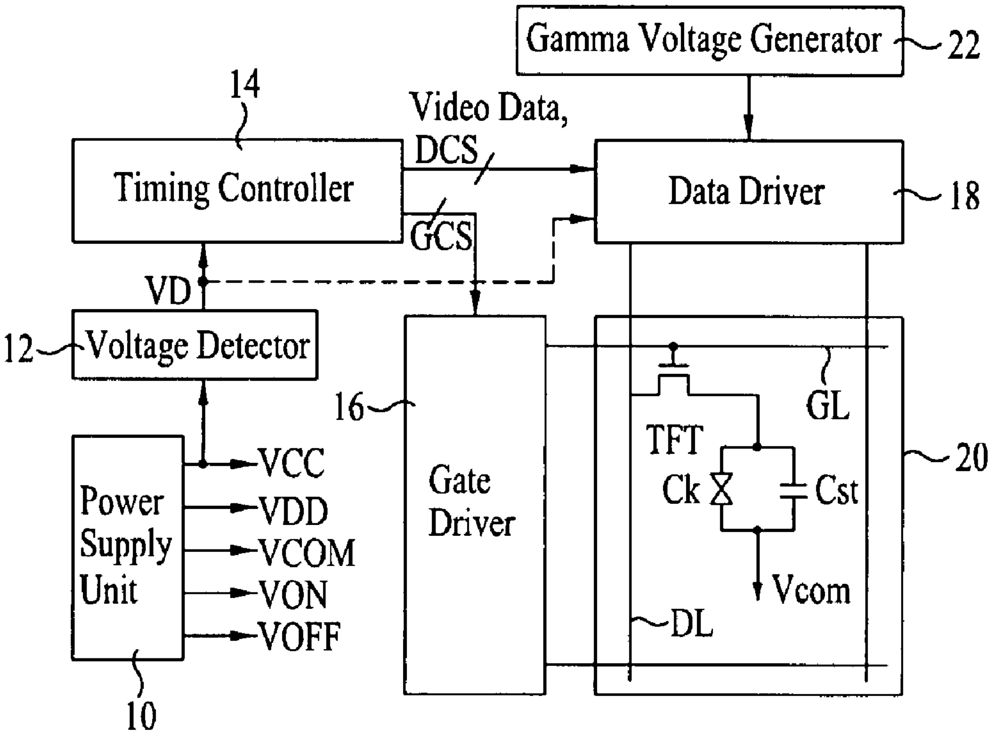
FIG. 1 is a block diagram illustrating a liquid crystal display (LCD) device according to an exemplary embodiment.

FIG. 1 is a block diagram illustrating a liquid crystal display (LCD) device according to an exemplary embodiment of the present invention.

As shown in FIG. 1, the LCD device includes a liquid crystal panel 20 for displaying an image, a gate driver 16 for driving gate lines GL provided at the liquid crystal panel 20, and a data driver 18 for driving data lines DL provided at the liquid crystal panel 20. The LCD device also includes a timing controller 14 for controlling the gate driver 16 and data driver 18, a power supply unit 10 for generating drive voltages required for respective circuit blocks, and a voltage detector 12 connected between the power supply unit 10 and the timing controller 14.

The power supply unit 10 receives power from a source external to the LCD device and supplies an input voltage VCC to the timing controller 14, voltage detector 12, data driver 18, and gate driver 16, as a drive voltage. Using the input voltage VCC, the power supply unit 10 also generates an analog drive voltage VDD for the data driver 18 and a gamma voltage generator 22, generates a gate-on voltage VON and a gate-off voltage VOFF as output voltages of the gate driver 16, and generates a common voltage VCOM of the liquid crystal panel 20.

When the power supply unit is turned off as the supply of the input voltage to the power supply unit 10 is cut off, the drive voltage VCC output from the power supply unit 10 decreases gradually to converge to a ground voltage. The analog drive voltage VDD, gate-on voltage VON, gate-off voltage VOFF, and common voltage VCOM generated in the power supply unit 10 using the drive voltage VCC also converge gradually to the ground voltage, starting from a point in time later than that of the drive voltage VCC. In other words, when the supply of the input voltage VCC is cut off in accordance with the powering-off of the liquid crystal panel, the output voltages VCC, VDD, VON, VOFF, and VCOM from the power supply unit 10 converge to the ground voltage after a time delay determined by a resistor R and a capacitor C included in or connected to the power supply unit 10.

The voltage detector 12 senses a variation in the level of the drive voltage VCC output from the power supply unit 10, and thus, detects a power-off point. Upon detecting the power-off point, the voltage detector 12 enables a power-off detect signal VD to be supplied to the timing controller 14. In other words, the voltage detector 12 monitors the drive voltage VCC output from the power supply unit 10 by comparing the drive voltage VCC with a reference voltage, and outputs a disabled power-off detect signal VD when the drive voltage VCC is not lower than the reference voltage. On the other hand, when the drive voltage VCC from the power supply unit 10 is lower than the reference voltage due to an OFF state of the power supply unit 10, the voltage detector 12 outputs an enabled power-off detect signal VD. The reference voltage is set such that a voltage corresponding to 60 to 85% of the drive voltage VCC can be detected. For example, when the drive voltage VCC is about 3.3V, the reference voltage is set such that the point of time when the drive voltage is reduced to about 2.5V is detected. The power-off detect signal VD from the voltage detector 12 may also be output to the data driver 18.

The timing controller 14 arranges video data supplied from the external of the LCD panel, and supplies the arranged video data to the data driver 18. The timing controller 14 generates gate control signals GCS and data control signals DCS for controlling the driving timings of the gate driver 16 and data driver 18, using a dot clock DCLK, a data enable signal DE, a vertical sync signal V, a horizontal sync signal H, etc. The gate control signals GCS include a gate start pulse GSP for starting the driving of the gate driver 16, a gate shift clock GSC for controlling the output timing of the gate driver 16, a gate output enable signal GOE for controlling the output period of a scan signal from the gate driver 16, and a flicker preventing signal FLK for reducing the gate-on voltage VON. The data control signals DCS include a source start pulse SSP for starting the driving of the shift register included in the data driver 18, a source shift clock SSC for controlling an output from the shift resistor, namely, the sampling timing of a data signal, a source output enable signal SOE for controlling the output period of the data signal, and a polarity control signal POL for controlling the voltage polarity of the data signal.

Upon receiving an enabled power-off detect signal VD from the voltage detector 12 in accordance with an OFF state of the power supply unit 10, the timing controller 14 immediately changes the frequency of the gate control signals GCS, and outputs the resultant signal, within a period of time for which the drive voltage VCC from the power supply unit 10 converges to a ground voltage after a certain delay time. Simultaneously, the timing controller 14 may output general data control signals DCS while selecting off-data such as white data or black data and outputting the selected off-data to the data driver 18. The timing controller 14 may disable all data control signals DCS.

The gamma voltage generator 22 divides the analog drive voltage VDD from the power supply unit 10, to generate a plurality of gamma voltages corresponding to a plurality of different grayscale values. The gamma voltage generator 22 supplies the gamma voltages to the data driver 18.

The data driver 18 selects a desired one of the gamma voltages generated from the gamma voltage generator 22, based on the video data from the timing controller 14, and supplies the selected gamma voltage to the data lines DL of the liquid crystal panel 20. In detail, the data driver 18 includes a shift register for sequentially outputting sampling signals while shifting the source start pulse SSP in accordance with the source shift clock SSC, a latch for sequentially latching the video data in response to the sampling signals, and outputting the latched video data in response to the source output enable signal SOE, and a digital/analog converter for selecting a desired gamma voltage in accordance with the video data from the latch. The data driver 18 thus is used in converting the digital video data into an analog video data signal, determining the polarity of the video data signal in response to the polarity control signal POL, buffering, by means of an output buffer, the video data signal from the digital/analog converter, and outputting the buffered video data signal to respective data lines DL.

When the power supply unit 10 is turned off, the data driver 18 can short-circuit all data lines DL in response to a source output enable signal SOE from the timing controller 14. When the data lines DL are short-circuited, an average value of data signals with positive and negative polarities previously supplied to the data lines DL are equally supplied to the data lines DL. Alternatively, the data driver 18 may output off-data, such as white data or black data, to the data lines DL. In this case, the off-data may be supplied from the timing controller 14. Alternatively, for the off-data, data previously stored in the data driver 18 may be used. Upon receiving an enabled power-off detect signal VD from the voltage detector 12, the data driver 18 selects the stored off-data, and outputs the off-data to the data lines DL. As a result, an average value of the previous data signals or off-data is equally supplied to all data lines DL.

The gate driver 16 generates a scan signal in accordance with the gate control signal GCS from the timing controller 14, to sequentially drive the gate lines GL. In detail, the gate driver 16 sequentially outputs the scan signal while shifting the gate start pulse GSP in accordance with the gate shift clock GSC. The gate driver 16 also selects the gate-on voltage VON from the power supply unit 10, and sequentially outputs the selected gate-on voltage VON as the scan signal. At times other than the scan signal outputting period, the gate driver 16 selects and outputs the gate-off signal VOFF. Also, the gate driver 16 decreases the gate-on voltage VON in response to the flicker preventing signal FLK before the scan signal decreases from the gate-on voltage VON to the gate-off voltage VOFF. Thus, a decrease in gate voltage variation $\Delta Vg$ occurs because the scan signal decreases stepwise from the gate-on voltage VON to the gate-off voltage VOFF. The gate driver 16 having the above-described functions has an integrated structure, and may be connected to the liquid crystal panel 20 or may be built in the liquid crystal panel 20.

When the power supply unit 10 is turned off, the gate driver 16 outputs a scan signal in response to the gate control signals GCS which has an increased frequency in accordance with operation of the timing controller 14. As a result, the gate lines GL are rapidly driven. That is, the gate driver 16 rapidly drives the gate lines in response to the gate control signals GCS within a period of time for which the voltages VCC, VON, and VOFF supplied from the power supply unit 10 to the gate driver 16 are transistioning. In detail, the gate driver 16 rapidly outputs a scan signal, which is rendered to be a gate-on voltage VON, to the gate lines GL in a sequential manner, and maintains the gate-on voltage VON supplied to the gate lines GL. As a result, the number of the gate lines GL maintained at the gate-on voltage VON sequentially increases. Thus, the gate-on voltage VON is supplied to all gate lines GL.

The gate lines GL and data lines DL of liquid crystal panel 20 intersect with each other while being arranged at opposite sides of an insulating film. The sub-pixels are arranged in the form of a matrix at respective intersects of the gate lines GL and data lines DL. As shown in FIG. 1, each sub-pixel includes a thin film transistor TFT connected to one gate line GL and one data line DL. Each sub-pixel also includes a liquid crystal capacitor Clc and a storage capacitor Cst connected to the thin film transistor TFT and in parallel to one another. The liquid crystal capacitor Clc includes capacitance arising from the liquid crystals. The liquid crystal capacitor Clc also includes a pixel electrode and a common electrode for applying an electric field to the liquid crystals. The storage capacitor Cst may have structure including a pixel electrode and a common electrode overlapped with each other, and an insulating film interposed between the pixel electrode and the common electrode. Alternatively, the storage capacitor Cst may have a structure including a pixel electrode overlapped with the gate line and arranged upstream from the gate line associated with the pixel electrode. The electrodes may be separated by an insulating film. The thin film transistor TFT supplies the data signal from the data line DL to the pixel electrode in response to the gate-on voltage VON by means of the scan signal from the gate line GL. The thin film transistor TFT also sustains the data signal supplied to the pixel electrode in response to the gate-off voltage VOFF. The liquid crystal capacitor Clc is charged with a pixel voltage, namely, a differential voltage between the data signal supplied to the pixel electrode and the common voltage VCOm supplied to the common electrode, and drives the liquid crystals in accordance with the charged pixel voltage, thereby controlling the light transmittance through the liquid crystals. Thus, the gray-scale display of each sub-pixel is achieved. The storage capacitor Cst stably sustains the pixel voltage charged in the liquid crystal capacitor Clc for a period of time for which the thin film transistor TFT is in an OFF state. In this case, since a decrease in gate voltage variation ΔVg occurs due to a stepwise decrease in the scan signal the scan signal from the gate-on voltage VON to the gate-off voltage VOFF, the variation in the pixel voltage charged in each sub-pixel, ΔVp, proportional to the gate voltage variation ΔVg is also decreased. Accordingly, generation of flickers caused by the pixel voltage variation ΔVp is prevented.

When the power supply unit 10 is turned off, the thin film transistors TFT of the liquid crystal panel 20 are rapidly turned on within a period of time for which the gate-on voltage VON is supplied to the gate lines GL by the gate driver 16 operating rapidly. The turned-on thin film transistors TFT are maintained in their ON state during the driving of the gate lines GL. Accordingly, the voltage equally supplied to all data lines DL via the data driver 18, namely, the average value of the previous data or off-data, is supplied to all pixels, and thus, each liquid crystal capacitor is discharged. As a result, it is possible to prevent generation of a residual image.

Figure 2:
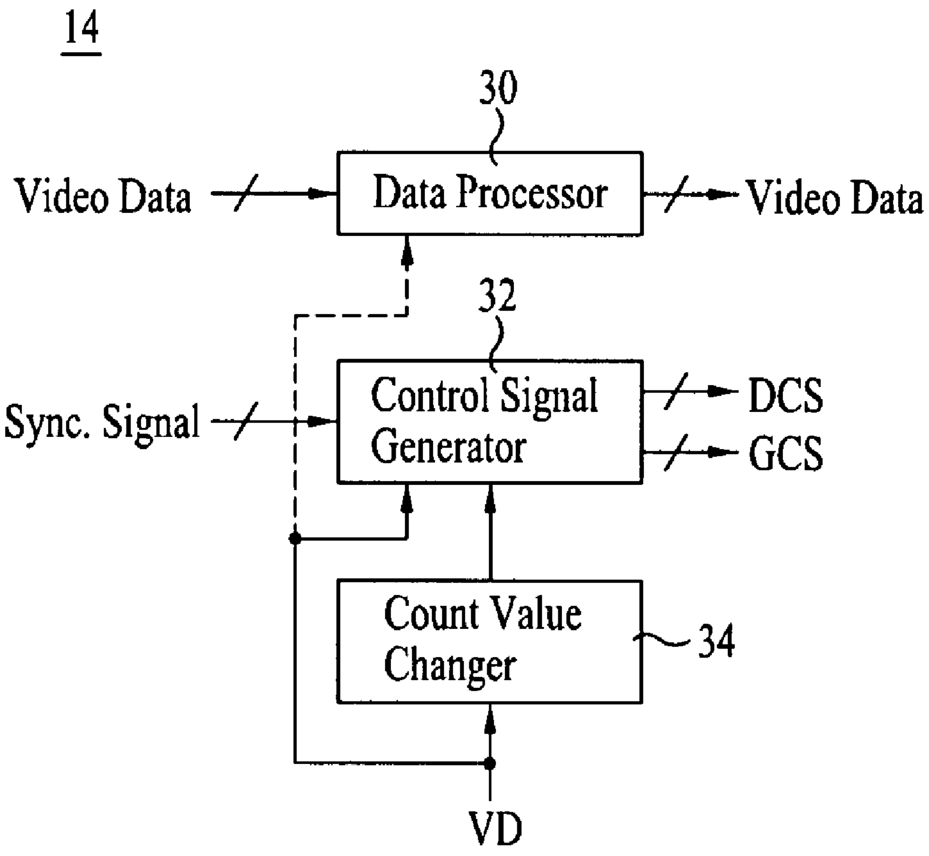
FIG. 2 is a block diagram illustrating the internal configuration of a timing controller shown in FIG. 1.
Figure 3:
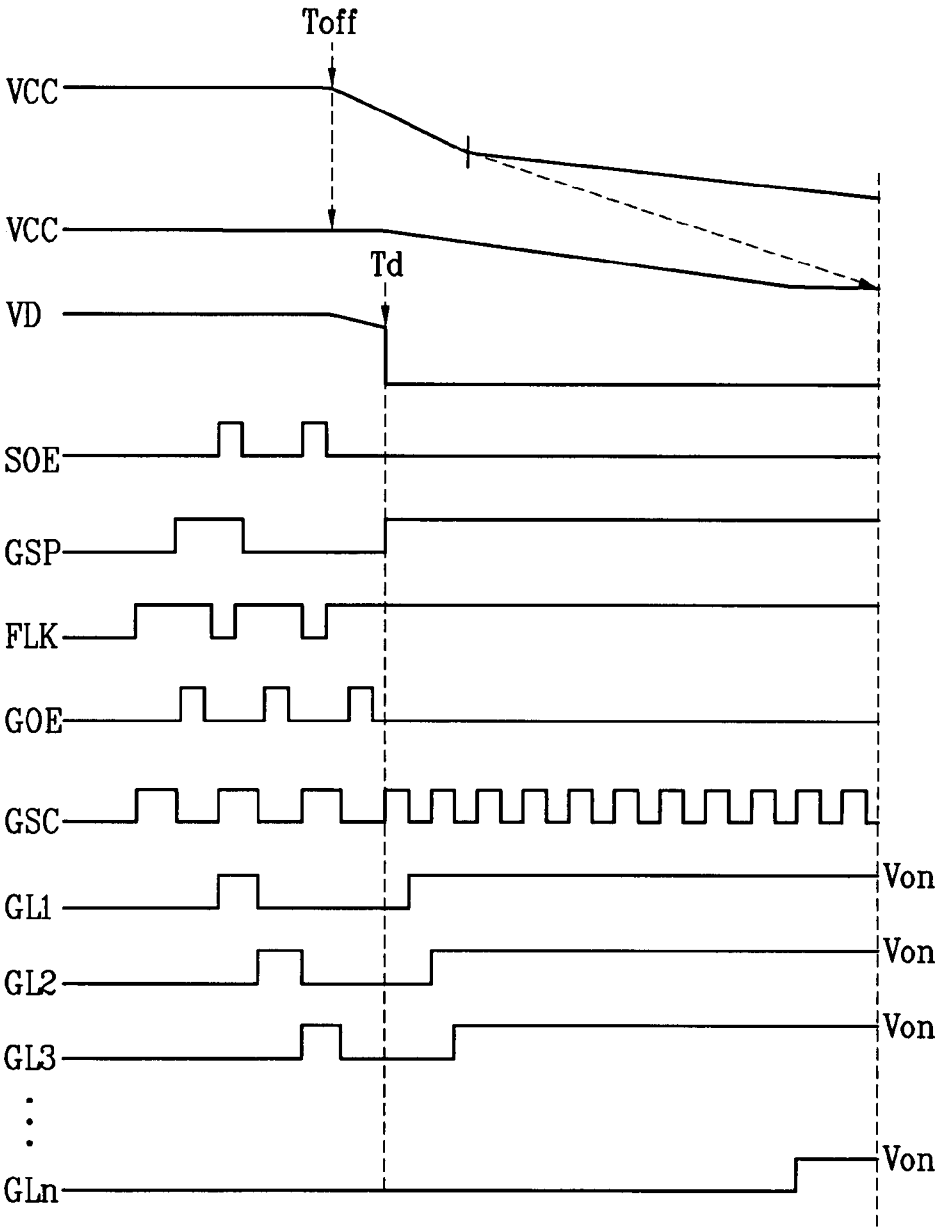
FIG. 3 is a waveform diagram of the input and output signals of the timing controller shown in FIG. 2.

FIG. 2 is a block diagram illustrating the internal configuration of the timing controller 14 shown in FIG. 1. FIG. 3 is a waveform diagram of the input and output signals of the timing controller 14 shown in FIG. 2. As shown in FIG. 2, the timing controller 14 includes a data processor 30, a control signal generator 32, and a count value changer 34.

The data processor 30 arranges video data received from the external to the LCD device, and outputs the arranged video data to the data driver 18. Meanwhile, when an enabled power-off detect signal VD from the voltage detector 12 is input, the data processor 30 can select off-data such as previously-stored white or black data, and can output the selected off-data.

The control signal generator 32 generates a gate control signal GCS and a data control signal DCS using a plurality of sync signals DCLK, DE, V, and H, and outputs the generated gate control signals GCS and data control signals DSC to the gate driver 16 and data driver 18, respectively. As shown in FIG. 3, the gate control signals GCS include a gate start pulse GSP, a gate shift clock GSC, a gate output enable signal GOE, and a flicker preventing signal FLK. The data control signals DCS include a source start pulse SSP, a source shift clock SSC, a source output enable signal SOE, and a polarity control signal POL. Each signal included in the gate control signals GCS and the data control signals DCS is generated in accordance with a predetermined count value counted using an associated one of the counters included in the control signal generator 32 and also using at least one of the data enable signal DE, the vertical sync signal V, the horizontal sync signal H and the dot clock DCLK.

When an enabled power-off detect signal VD from the voltage detector 12 is input, the control signal generator 32 increases the frequency of the gate control signal GCS in response to a count value changed by the count value changer 34. In detail, the control signal generator 32 increases the frequency of the gate shift clock GSC in response to the count value changed by the count value changer 34, and outputs the frequency-increased gate shift clock GSC. During the supply of the frequency-increased gate shift clock GSC, the control signal generator 32 enables the gate start pulse GSP while disabling the flicker preventing signal FLK and gate output enable signal GOE, as shown in FIG. 3, in order to maintain the outputs GL of the gate driver 16 at the gate-on voltage VON. Alternatively, the control signal generator 32 may increase the frequency of the gate start pulse GSP such that the gate start pulse GSP has the same period as the gate shift clock GSC, in order to maintain the gate-on voltage GOE.

In response to the enabled power-off detect signal VD, the control signal generator 32 may also enable only the source output enable signal SOE to a low level, as shown in FIG. 3, or may toggle the source output enable signal SOE in a general manner. In response to the resultant source output enable signal SOE, the data driver 18 can output off-data. On the contrary, the control signal generator 32 may disable the source output enable signal SOE to a high level, to short-circuit all data lines DL, and thus, to enable the average value of the previous data to the data lines DL.

Upon receiving the power-off detect signal VD from the voltage detector 12, the count value changer 34 changes the count value of the counter adapted to generate the gate control signal GCS. The count value changer 34 changes the count value of the counter adapted to generate the gate shift clock GSC in response to the power-off detect signal VD such that the frequency of the gate shift clock GSC increases. For example, the count value changer 34 changes the count value such that the frequency of the gate shift clock GSC increases to correspond to about 20 to 200 times the frequency of the dot clock DCLK because the frequency of the gate shift clock GSC is set based on the dot clock DCLK. The count value changer 34 may also change the count value of the counter adapted to generate the gate start pulse GSP such that the frequency of the gate start pulse GSP increases. The count value changer 34 can adjust the count value for the above-described frequency change in accordance with the voltage delay period set by the time constant RC of the power supply unit 10.

Referring to FIG. 3, the drive voltage VCC decreases gradually to converge to a ground voltage, starting from an OFF point Toff of the power supply unit 10. In this case, the drive voltage VCC converges to the ground voltage after a delay time determined by a time constant set by a resistor and a capacitor included in or connected to the power supply unit 10. During the delay of the drive voltage VCC, the voltage detector 12 detects the point of time when the drive voltage VCC decreases below a reference voltage, namely, a point Td. Upon detecting the point Td, the voltage detector 12 generates a power-off detect signal VD enabled to a low level.

Upon receiving the enabled power-off detect signal VD from the voltage detector 12, the timing controller 14 increases the frequency of the gate shift clock GSC, enables the gate start pulse GSP, and disables the flicker preventing signal FLK and gate output enable signal GOE. The gate driver 16 rapidly outputs the gate-on voltage VON to the gate lines GL1 to GLn in response to the gate shift clock GSC and gate start pulse GSP, to turn on all thin film transistors TFT. At this time, the timing controller 14 enables the source output enable signal SOE. As a result, the data driver 18 outputs off-data selected by the timing controller 14 or data driver 18 to all data lines DL, so that the liquid crystal panel 20 displays the off-data. Thus, generation of a residual image is prevented.

Figure 4:
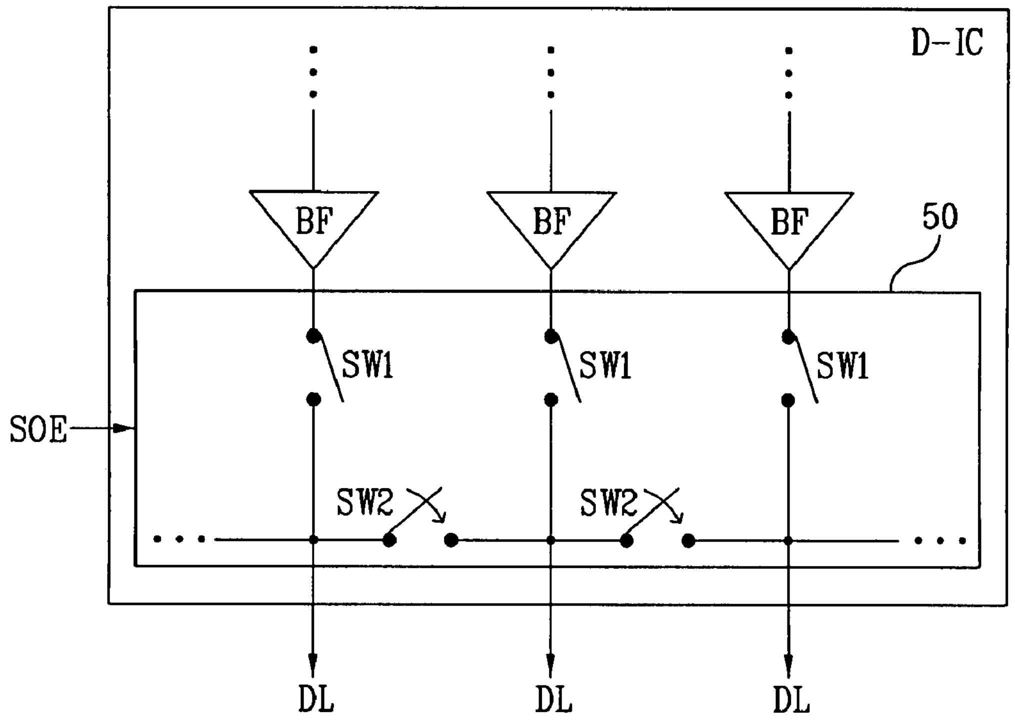
FIG. 4 is a block diagram schematically illustrating an output unit of a data driver included in a liquid crystal display device according to another embodiment.
Figure 5:
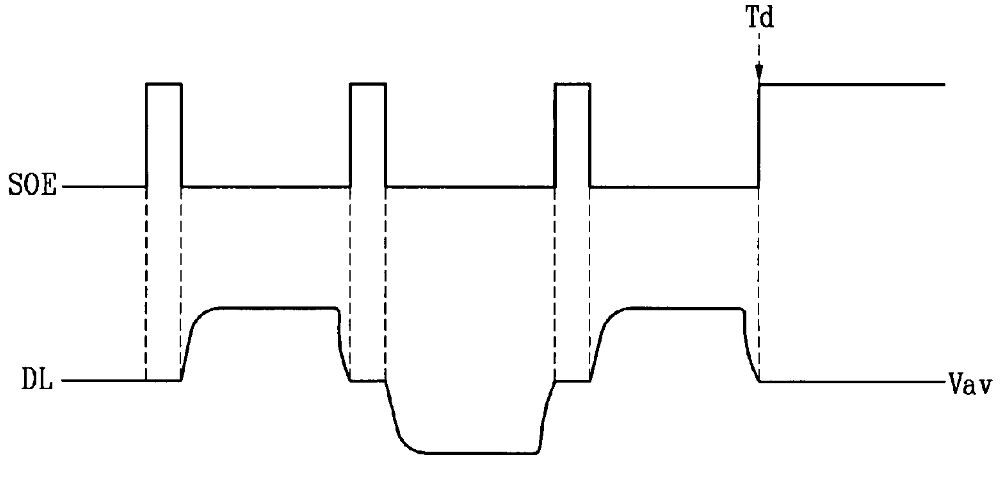
FIG. 5 is a waveform diagram of the input and output signals of the data driver shown in FIG. 4.
Figure 6:
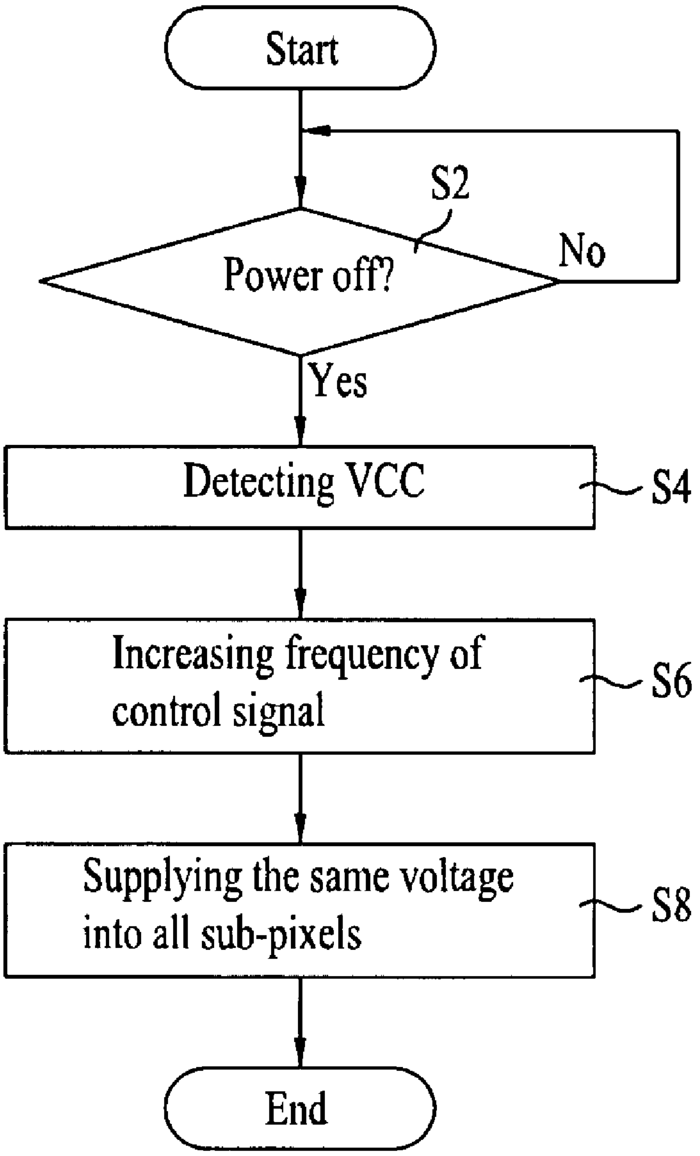
FIG. 6 is a flow chart explaining sequential steps of a method for driving the LCD device upon power-off in accordance with an exemplary embodiment.

Meanwhile, where the data driver 18 includes a built-in charging share block 50 connected between the output buffers BF and the data lines DL, as shown in FIG. 4, the timing controller 14 disables the source output enable signal SOE to a high level in response to an enabled power-off detect signal VD, as shown in FIG. 5. In response to the disabled source output enable signal SOE, first switches SW1 respectively connecting the output buffers BF and the data lines DL are turned off, and second switches SW2 connected between adjacent data lines DL are turned on. Since all data lines DL are short-circuited by the turned-on second switches SW2, the average voltage Vav of the previous positive data and negative data is equally applied to all pixels. As a result, generation of a residual image is prevented.

FIG. 5 is a flow chart explaining sequential steps of a method for driving the LCD device having the above-described configuration when the LCD device is powered off, in accordance with an exemplary embodiment of the present invention.

When the power supply unit 10 of the LCD device is turned off, at step S2, the control procedure proceeds to step S4. At step S4, the voltage detector 12 monitors the drive voltage VCC output from the power supply unit 10, to detect a power-off point. The voltage detector 12 compares the drive voltage VCC from the power supply unit 10 with the reference voltage, and outputs an enabled power-off detect signal VD when the drive voltage VCC is lower than the reference voltage.

At step S6, the timing controller 14 increases the frequency of a control signal in response to the power-off detect signal VD. For example, when the power-off detect signal VD is enabled, the timing controller 14 increases the frequency of the gate shift clock GSC, and enables the gate start pulse GSP. The timing controller 14 may also increase the frequency of the gate start pulse GSP. At this time, the timing controller 14 may enable the source output enable signal SOE to a low level, may toggle the source output enable signal SOE in a general manner, or may disable the source output enable signal SOE. Meanwhile, the timing controller 14 or data driver 18 may select and output off-data when the power-off detect signal VD is enabled.

Subsequently, at step S8, the gate driver 16 rapidly drives the gate lines GL in response to the frequency-increased gate shift clock GSC and the enabled or frequency-increased gate start pulse GSP, thereby causing all thin film transistors TFT to be turned on.

At this time, the data driver 18 outputs, TO ALL DATA LINES dl, the off-data selected by the timing controller 14 or data driver 18, in response to the enabled or toggled source output enable signal SOE, such that the liquid crystal panel 20 displays the off-data. Thus, generation of a residual image is prevented in this case. On the other hand, in response to the disabled source output enable signal SOE, all data lines DL are short-circuited such that the average voltage of the previous positive data and negative data is equally applied to all pixels. Thus, generation of a residual image is prevented in this case.

As apparent from the above description, the LCD device and driving method thereof according to the present invention can rapidly drive the gate lines by detecting the power-off point, and increasing the frequency of the gate control signal, and thus, can apply the same voltage to all sub-pixels via the turned-on thin film transistors. Accordingly, it is possible to prevent generation of a residual image caused by power-off.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:

a power supply unit that outputs a plurality of drive voltages after delaying the drive voltages;

a voltage detector that compares one of the drive voltages with a reference voltage, and outputs a power-off detect signal based on the result of the comparing;

a timing controller that increases a frequency of a gate shift clock and enables a gate start pulse in response to the power-off detect signal, and outputs the frequency-increased gate shift clock and the enabled gate start pulse, wherein the enabled gate start pulse maintains in the enable state for a enable period of the power-off detect signal;

a gate driver that outputs sequentially a scan signal of gate-on voltage in response to the enabled gate start pulse and the frequency-increased gate shift clock, wherein the gate-on voltage of the scan signal is maintained for the enable period of the power-off detect signal, wherein the gate start pulse is used in the gate driver before and after the power-off detect signal is enabled;

a data driver that outputs a constant voltage in response to a control signal from the timing controller; and a liquid crystal panel that applies the constant voltage to sub-pixels of the liquid crystal panel in response to the scan signal, wherein the voltage detector compares a drive voltage adapted to drive the timing controller with the reference voltage, having a voltage of 60%~85% of the drive voltage, wherein during the supply of the frequency-increased gate shift clock from the timing controller to the gate driver, the timing controller disables a flicker preventing signal and a gate output enable signal which are supplied to the gate driver, and wherein during the supply of the frequency-increased gate shift clock from the timing controller to the gate driver, the number of gate lines maintaining the gate-on voltage is increased more and more until all gate lines maintain the gate-on voltage.

2. The liquid crystal display device according to claim 1, wherein the timing controller changes a count value of a counter adapted to generate the gate shift clock, in response to the power-off detect signal, to increase the frequency of the gate shift clock.

3. The liquid crystal display device according to claim 2, wherein the timing controller adjusts the counter value adapted to increase the frequency, in accordance with a voltage delay period set by a time constant of the power supply unit.

4. The liquid crystal display device according to claim 1, wherein:

the timing controller outputs off-data including white data or black data to the data driver in response to the power-off detect signal; and the timing controller enables or toggles a source output enable signal, to cause the off-data to be output to the liquid crystal panel.

5. The liquid crystal display device according to claim 1, wherein:

the data driver selects off-data including white data or black data in response to the power-off detect signal; and the timing controller enables or toggles the source output enable signal, to cause the off-data to be output to the liquid crystal panel.

6. The liquid crystal display device according to claim 1, wherein:

the timing controller disables the source output enable signal, and outputs the disabled source output enable signal to the data driver; and the data driver short-circuits all data lines of the liquid crystal panel in response to the disabled source output enable signal.

7. The liquid crystal display device according to claim 6, wherein an average value of previous data voltages supplied to the data lines is supplied to the data lines due to the short circuit of the data lines.

8. A method for driving a liquid crystal display device upon power-off, comprising:

outputting a plurality of drive voltages after delaying the drive voltages;

comparing one of the drive voltages with a reference voltage, and outputting a power-off detect signal based on the result of the comparing;

increasing a frequency of a gate shift clock and enabling a gate start pulse in response to the power-off detect signal, and outputting the frequency-increased gate shift clock and the enabled gate start pulse, wherein the enabled gate start pulse maintains in the enable state for a enable period of the power-off detect signal;

outputting sequentially a scan signal of gate-on voltage to gate lines of a liquid crystal panel in response to the enabled gate start pulse and the frequency-increased gate shift clock, wherein the gate-on voltage of the scan signal is maintained for the enable period of the power-off detect signal, wherein the gate start pulse is used in a gate driver before and after the power-off detect signal is enabled;

outputting a constant voltage to data lines of the liquid crystal panel in response to a control signal; and applying the constant voltage to sub-pixels of the liquid crystal panel in response to the scan signal, wherein during the supply of the frequency-increased gate shift clock, a flicker preventing signal and a gate output enable signal are disabled, and wherein during the supply of the frequency-increased gate shift clock, the number of gate lines maintaining the gate-on voltage is increased more and more until all gate lines maintain the gate-on voltage.

9. The method according to claim 8, wherein the step of increasing the frequency of the gate shift clock comprises adjusting the frequency of the gate shift clock in accordance with a delay time of the drive voltage such that the frequency of the gate shift clock increases.

10. The method according to claim 8, further comprising:

selecting off-data including white data or black data in response to the power-off detect signal, and outputting the selected off-data; and enabling or toggling a source output enable signal, to cause the off-data to be output to the liquid crystal panel.

11. The method according to claim 8, further comprising:

disabling a source output enabling signal in response to the power-off detect signal, to short-circuit all data lines.

12. The method according to claim 11, wherein a average value of previous data voltages supplied to the data lines is supplied to the data lines due to the short circuit of the data lines.

13. The method according to claim 8, wherein a second level of the reference voltage is less than 75% of a first level of the driving voltage.

14. The method according to claim 8, wherein the power-off detect signal is output by comparing a drive voltage adapted to drive the timing controller with the reference voltage, having a voltage of 60%~85% of the drive voltage.

* * * * *